United States Patent [19]

Kramer

[11] Patent Number: 4,786,126
[45] Date of Patent: Nov. 22, 1988

[54] HOLOGON SCANNER SYSTEM

[75] Inventor: Charles J. Kramer, Pittsford, N.Y.

[73] Assignee: Holotek, Ltd., Rochester, N.Y.

[21] Appl. No.: 125,306

[22] Filed: Nov. 25, 1987

[51] Int. Cl.$^4$ ...................... G02B 26/10; G02B 27/28
[52] U.S. Cl. .................................... 350/3.71; 350/401
[58] Field of Search ................................ 350/3.71, 401

[56] References Cited

U.S. PATENT DOCUMENTS

| 4,610,500 | 9/1986 | Kramer | 350/3.71 |
| 4,637,679 | 1/1987 | Funato | 350/3.71 |

OTHER PUBLICATIONS

BEI Motion Systems, Little Rock, Ark., 72203, Product Information, "BEI Optical Encoders, A Class of One" (1986), 3 pps.
Teledyn/Gurley, Troy, N.Y. 12181-0088, Product Information on Increrental Disks, 2 pps. (Jul. 1986).
A. Arimoto et al., "Dual Beam Laser Diode Scanning System for Ultra High Speed Laser Beam Printers Using a Spot Control Method", *Applied Optics*, vol. 26, No. 13, Jul. 1, 1987, pp. 2254–2257.
W. H. White, "Laser Typesetters Bring Higher Resolutions to Electronic Output", *Elec. Publ. & Pr*, Aug./Sep. 1986, pp. 40–42.

*Primary Examiner*—Bruce Y. Arnold
*Attorney, Agent, or Firm*—Martin LuKacher

[57] ABSTRACT

A hologon scanner system in which a pair of laser beams which are collinear with each other are deflected by a common hologon scanner. The beams are initially linearly polarized in orthogonal directions and are combined in a polarization sensitive beam combiner so that they are collinear. The combined beams are passed through a quarter-wave plate (the laser beams both being of the same wavelength) so as to circularly polarize them in opposite hands. The combined circularly polarized beams may be modulated to change their intensity. Such modulation may be provided by an acousto-optic diffraction grating modulator. The modulated beams are then directed to the hologon deflector and are scanned across the image surface. The modulator is also part of a closed loop feedback system with a detector which responds to positional variations of the image surface due to its transport system and deflects the beam to compensate for such position variations.

14 Claims, 8 Drawing Sheets

HOLOGON SCANNER SYSTEM

DESCRIPTION

The present invention relates to hologon laser beam scanner systems, and particularly to a hologon scanner system in which a plurality of beams may be combined and deflected by a hologon deflector (diffraction grating based deflector element) which is rotatable to scan the beam along a line across an image surface.

The invention is especially suitable for use in laser printers for reprographic image reproduction, for example of half tones. Color separations may be made using the laser scanner with a large number of dots per inch (at high density and at a fast rate).

In order to form high-quality images suitable for use in printing, and particularly in order to make color separations, it is necessary that the density (number of dots per, inch), of the half tone be very high. The screen density may be of the order of a 100 or more. In a laser printer this requires the scanning beam to be deflected at a very fast rate and modulated also at a very fast rate. It is desirable to modulate at a rate of the order of 100 million pixels per second when working with a xerographic marking engine having a receptor surface which is scanned by the beam. In order to expose the receptor surface the intensity of the beam must be maintained even at these high rates. Merely deflecting a beam at a faster rate and driving the modulator at a faster rate may be practically unachievable because the physical limitations of a rotating deflector system and of optical modulators.

In accordance with the present invention, a plurality of scan beams which are collinear with each other and provide offset scanning lines are scanned at the same time thereby multiplying the effective scanning rate, data rate and laser power. The intensities of the beams are maintained since each is provided from a separate source (a separate laser).

When two beams are mixed, each may not be affected by the modulator or by the hologon scanner in the same way. The modulator and the deflector may transmit the combined beams with different efficiency. Each of the scan lines from each of the beams will then not be consistent and a usable image, particularly a usable half tone image, cannot be obtained.

In has been discovered, in accordance with the invention, that beams from a pair of lasers can be combined into collinear beams which can be modulated and deflected with a hologon scanner with equal efficiency thereby having the advantage of higher density through the use of dual beams and avoiding the mechanical and electronic problems of high speed scanning of a single beam. Also since two lower power lasers are less costly than a single high power laser, economies of cost are obtained with a dual beam hologon scanner system in accordance with the invention.

Another problem with scanning systems is that positioning variations in the receptor surface which is scanned, due in large part to speed variations in the system which transports the receptor surface, produces greater errors in the position of the lines scanned across the surface (both in line spacing and lateral position from line to line—which can cause visible banding in the image) greater than cross scan error, and lateral errors of the scan beam. It is a feature of this invention to correct such errors using a mini-deflector which deflects the beam prior to deflection in the main deflector, which is preferably the hologon deflector. The lateral errors can be compensated using the dot forming, fast modulator which enables the scans to start at different positions and turn the beam on and off at a pixel rate or data rate. The timing of the start of scan and the pixel rate is varied in accordance with the lateral positional variations.

Briefly described, a scanning system in accordance with the invention utilizes first and second lasers for providing first and second light beams of the same wavelength and which are polarized in orthogonal directions. A deflector for scanning the beam across an image surface is also provided. Means are provided for combining the beams along paths extending in the same direction and incident upon the deflector. After the beams are combined they are applied to means for circularly polarizing the beams. Since the beams are initially linearly polarized in orthogonal directions they are circularly polarized in opposite senses (in opposite hands), the circularly polarized beams may be modulated, as in a diffraction grating acousto-optic modulator and deflected by a hologon scanner with equal efficiency thereby enabling dual beams to be scanned across the image surface. The deflection of the beam by the mini-deflector is controlled to vary the beam position in the cross scan direction to compensate for variations in the position of the image surface due to variations in the speed of that surface, as well as correct for cross-scan beam tracking error associated with the hologon deflector.

Figure 1:
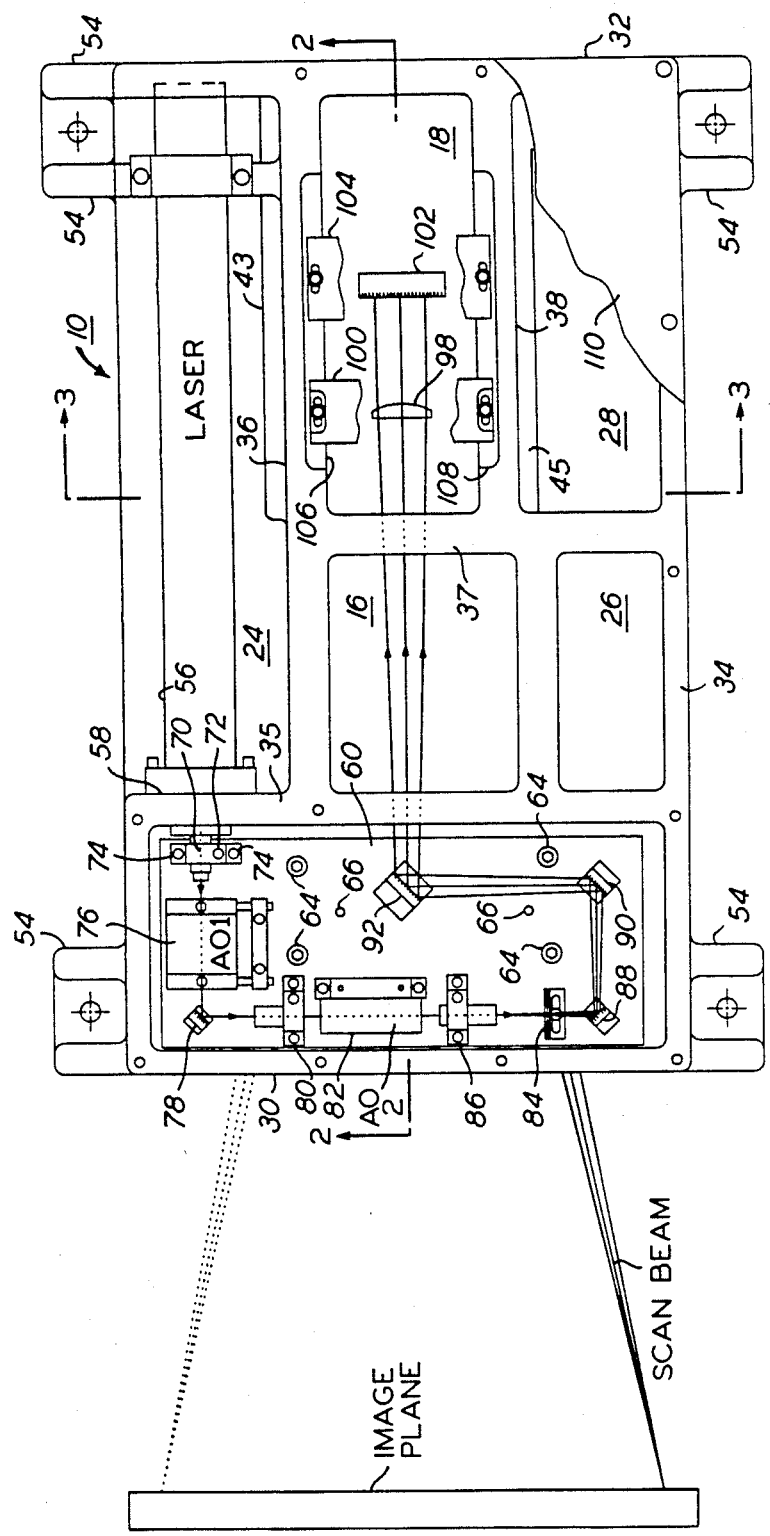
FIG. 1 is a plan view, from the top, of an integrated laser scanning system with the cover plate broken away to show the cells and the components mounted in different ones of these cells.
Figure 2:
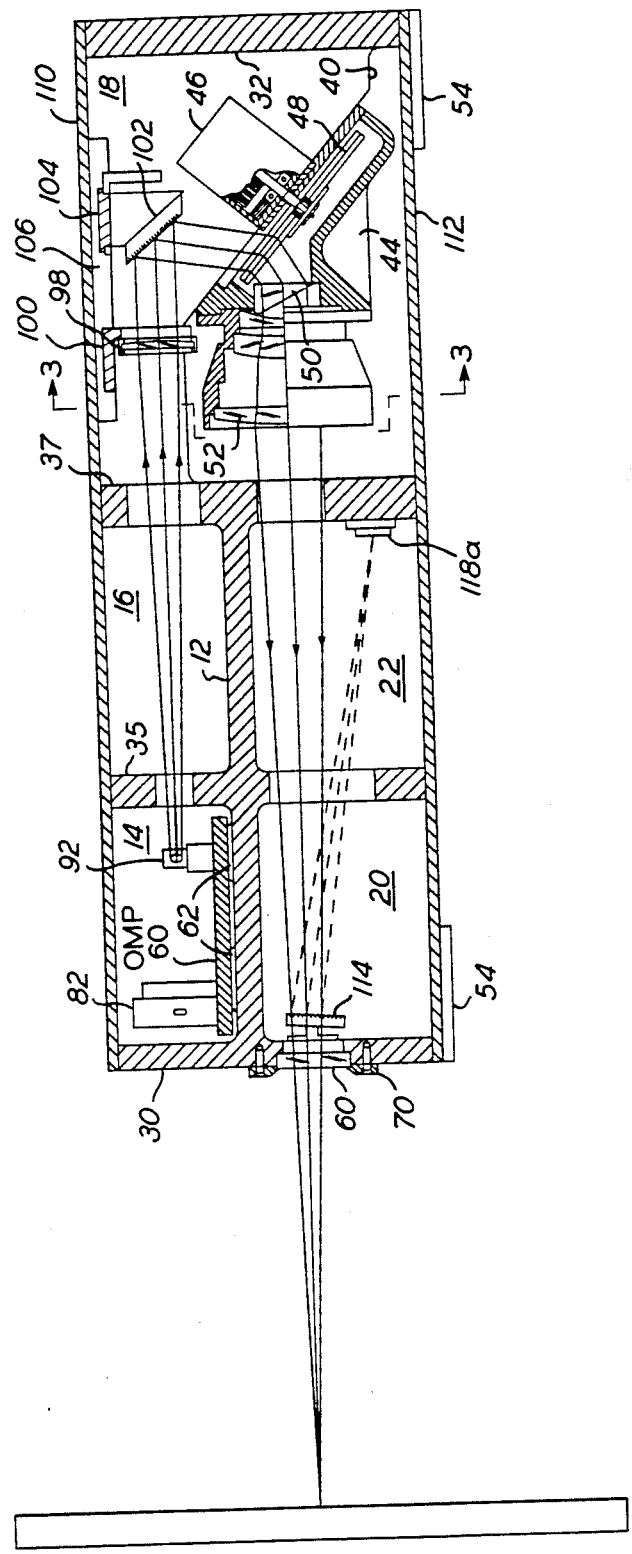
FIG. 2 is a sectional view in elevation, the section being taken along the line 2—2 in FIG. 1.
Figure 3:
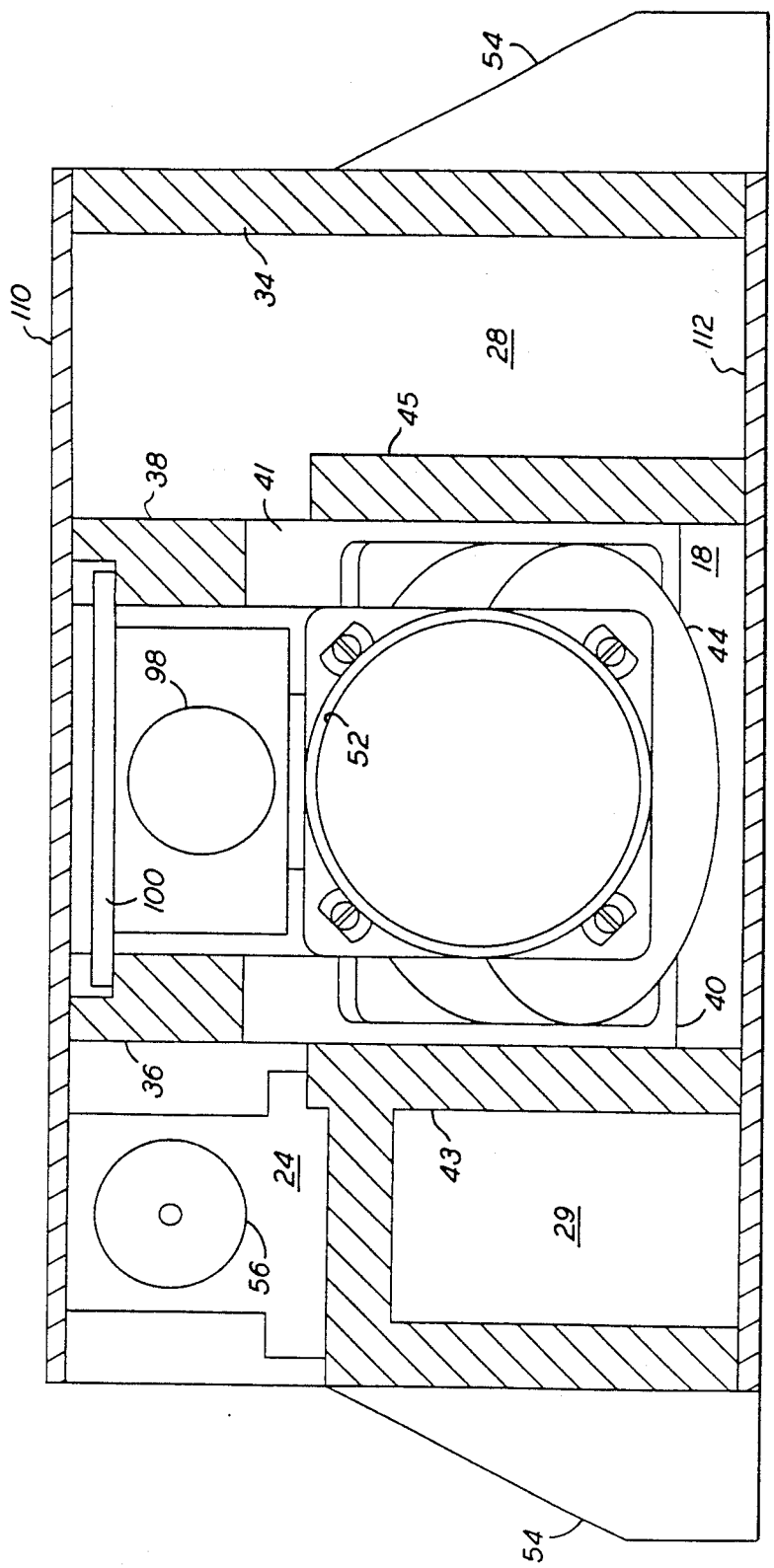
FIG. 3 is another sectional view, in elevation, taken along the lines 3—3 in FIGS. 1 and 2.
Figure 4:
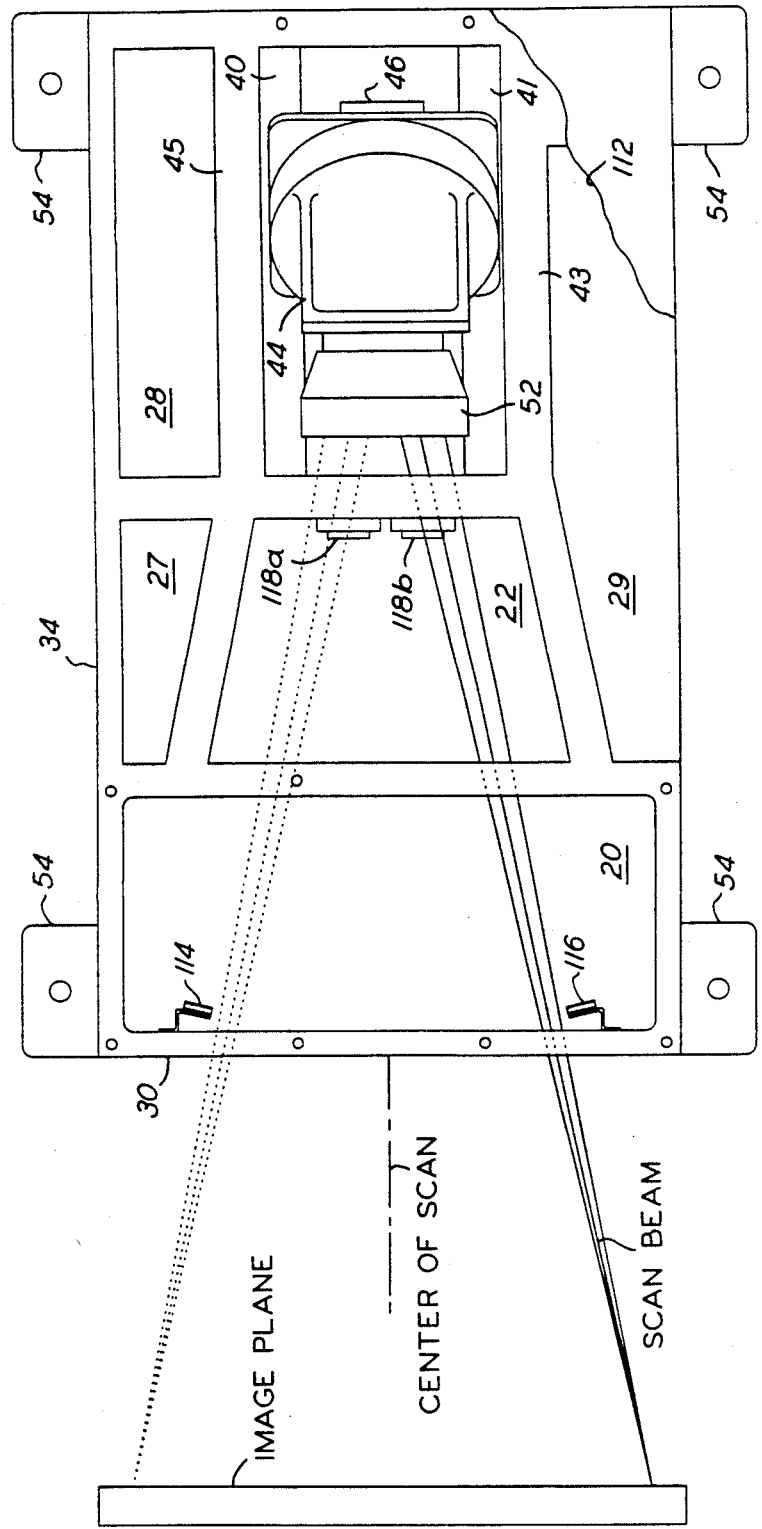
FIG. 4 is a plan view taken from the bottom of the scanning system illustrated in FIGS. 1, 2 and 3.
Figure 5:
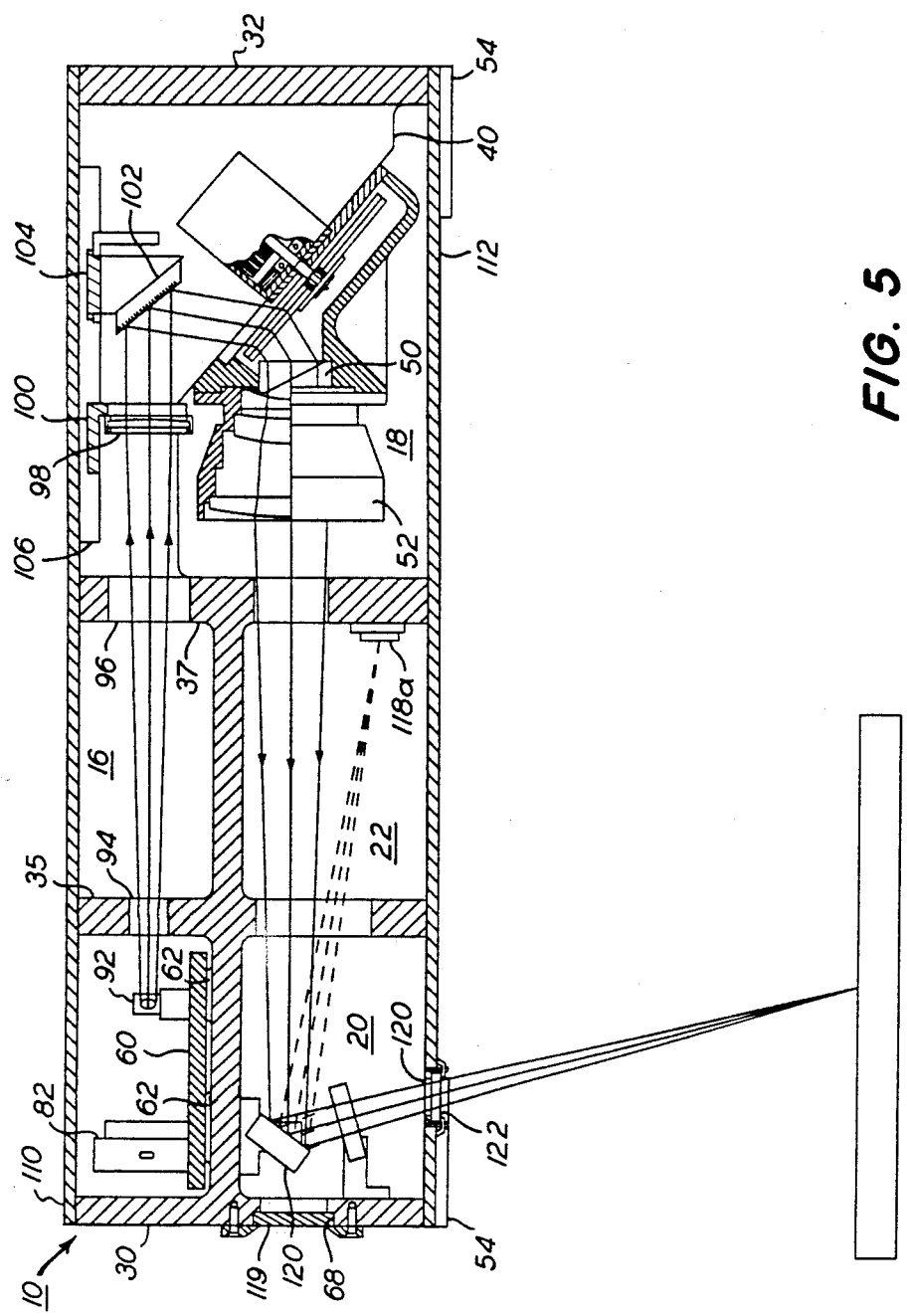
FIG. 5 is a view similar to FIG. 2 wherein means are provided for the exiting of the scanning beam through the bottom of the system.
Figure 6:
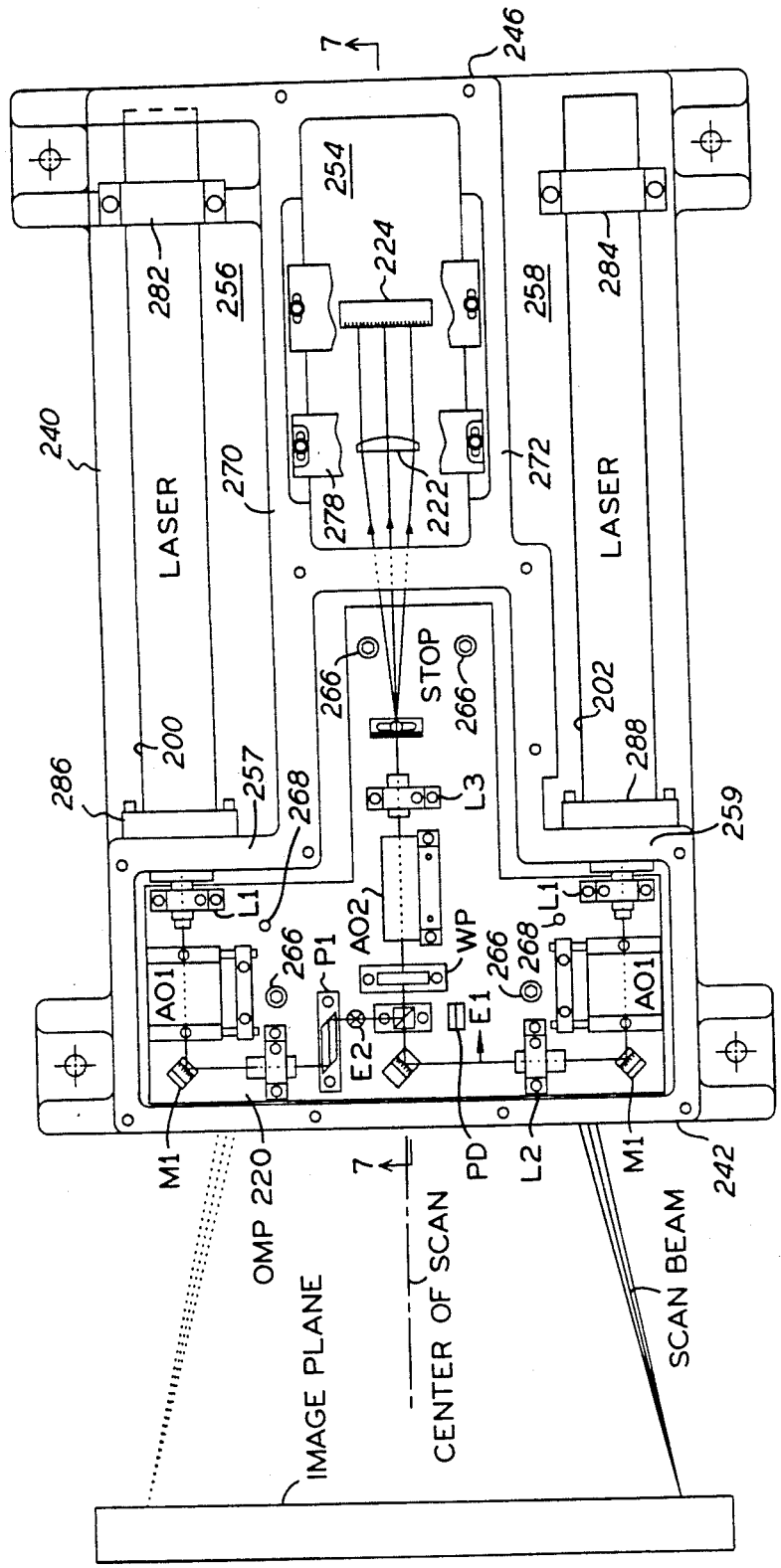
FIG. 6 is a plan view from the top, with the cover removed, of an integrated laser scanning system which utilizes two lasers.
Figure 7:
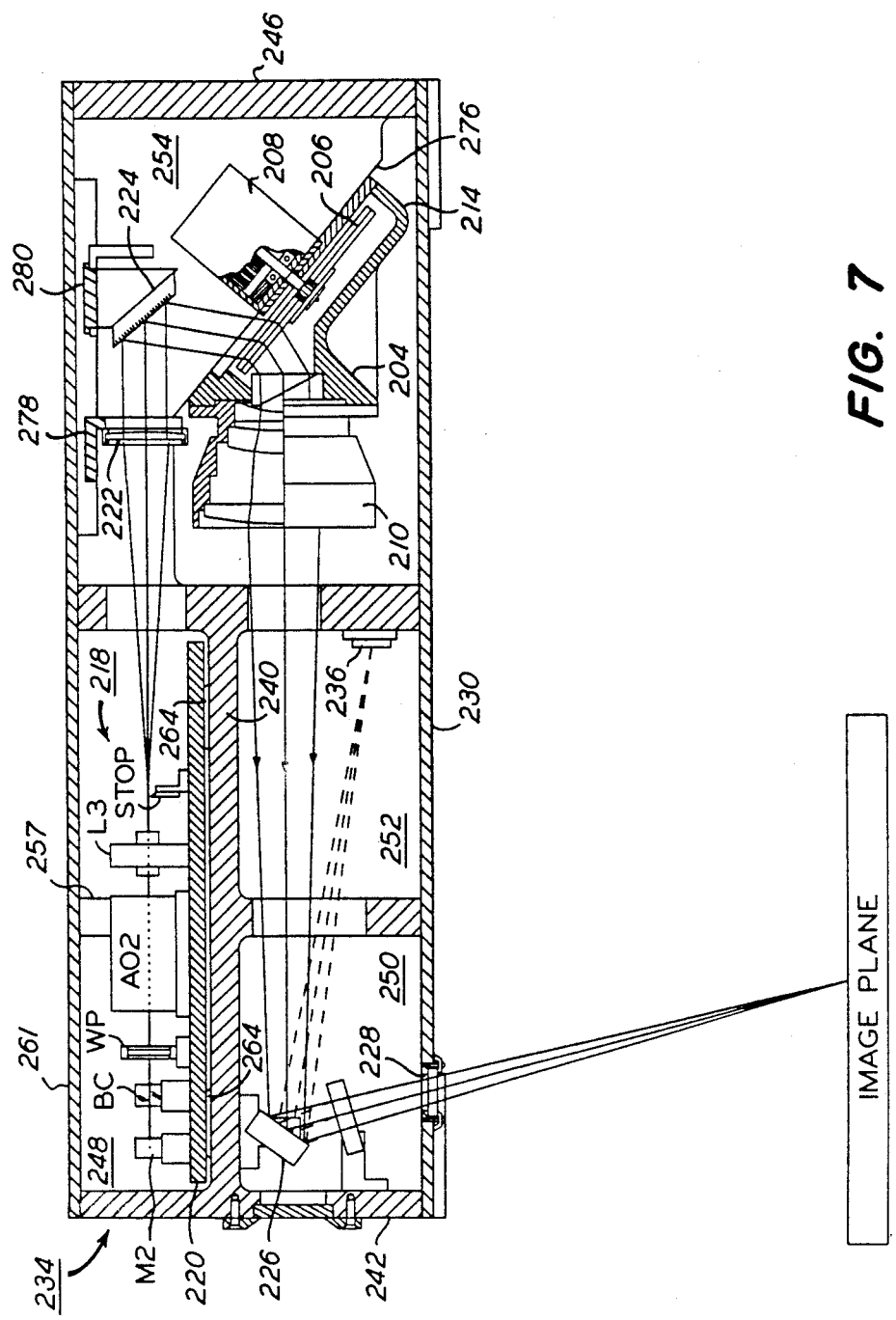
Figure 8:
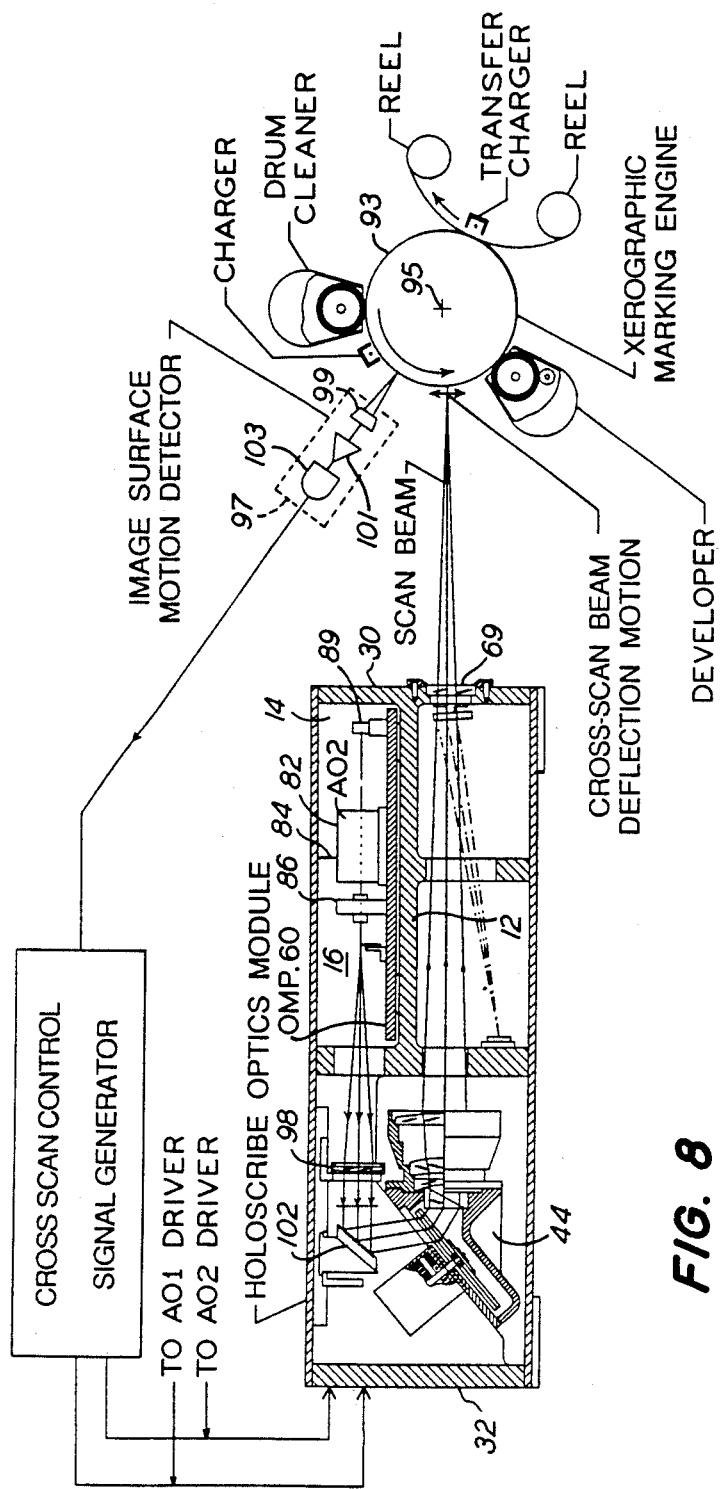
Figure 6:
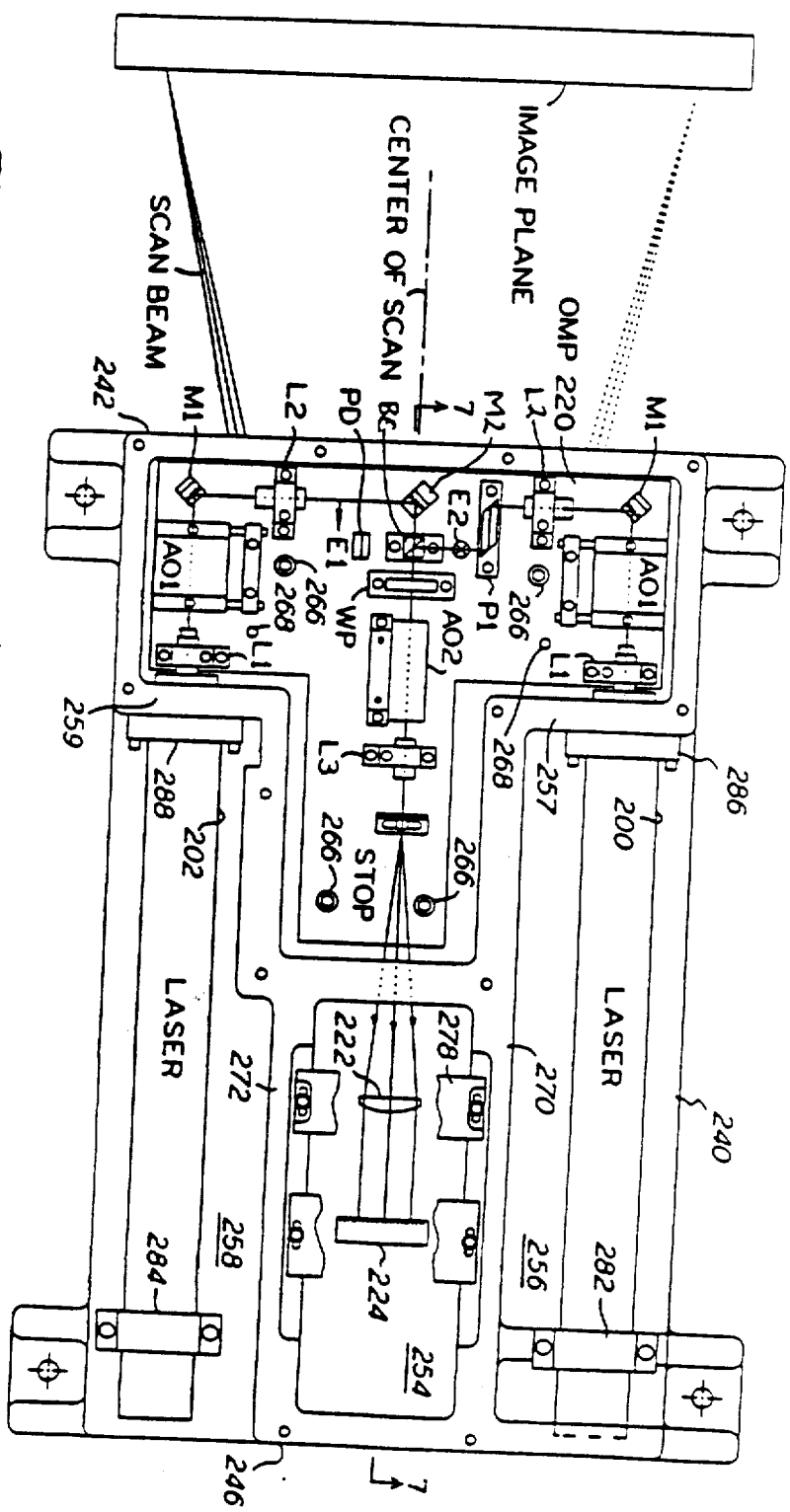

FIG. 7 is a view similar to FIG. 5 of the laser scanning system shown in FIG. 6 the section being taken along the line 7—7 in FIG. 6; and FIG. 8 is a view similar to FIG. 2 but veiwed from the opposite side of the unit (i.e., in a direction opposite to that of the arrows at the end of the line 2—2) and with the components on the optical mounting plate, OMP, arranged so that the optical modulator AO2 (82), lens 86 and stop 84 are disposed along the center line of the unit.

Referring to FIGS. 1 through 4 there is shown a housing or body 10 which is rigid and stiff, in effect containing a plurality "I"-beams as can be seen from the cross-section (FIG. 2). The body has a center plate 12 which, like the body, is generally rectangular. Walls extend from the plate to define a plurality of cells 14, 16, 18, 20, 22, 24, 26, 27, 28 and 29. The walls 30 and 32 at the ends of the body 10 close these ends. The side 34 of the body is formed by a continuous wall which closes the sides of the cells 14, 20, 26, 27, 28 and 29. Other walls are common to adjacent cells. The cells 24 and 14 share a common wall 35. A portion of the wall 35 between the cell 16 and 14 may be omitted as shown in FIGS. 6, 7 and 8 and an optical mounting plate OMP can be extended into cell 16 as shown in FIGS. 6, 7 and 8.

Walls 36 and 38 of the cell 18 are truncated to form gussets shown at 40 and 41. Buttresses 43 and 45 form lower parts of the walls 36 and 38. These gussets 40 and 41 provide surfaces on which a hologon deflector 44 is mounted. This hologon deflector contains a motor 46 which rotates a hologon disc 48 having holographically formed diffraction gratings in successive pie-shaped facets. This deflector also has a prism 50 and a preobjective lens 52. Such a hologon deflector is similar to design to U.S. Pat. No. 4,610,500 issued Sept. 9, 1986 to Charles J. Kramer, to which reference may be made for further information respecting the hologon deflector 44.

The central plate 12 and the walls which extend from the opposite sides thereof may be integral, and made from a casting of metal, such as aluminum or steel. A rigid plastic such as ultra high molecular weight polyurethane may be used. The body 10, which is constituted of the plate 12 and the walls extending from opposite sides thereof, is therefore an integral structure. Brackets or mounting pads 54 at the corners of the side walls 24 and 34, which may be projections from the center plate 12, are used for mounting the integrated scanning system in apparatus which uses the same, such as the laser printer.

A laser 56, such as is provided in a cylindrical body and which may be a red helium neon laser, suitably from 2 to 10 milliwatts output power, is mounted by suitable brackets in the cell 24. This laser may have optical components at its output end 58. The output laser beam propagates through an opening in the common wall 35 between the cells 14 and 24. Other lasers, such as a 0.5 mW HeNe green laser, may alternatively be used; selection depending upon printer requirements.

The laser projects a beam of light to optical components which are mounted in the cell 14 on an optical mounting plate (OMP) 60. As shown in FIG. 8 the OMP 60 can extend into cell 16. The mounting plate is assembled on a flat surface of the central plate 12 by means of mounting pads 62 and bolts 64. Alignment pins or holes 66 for receiving such alignment pins are provided by the surface of the plate 12 which forms the floor of the cell 14. Holes in the optical mounting plate 60, or pins which extend from the optical mounting plate into holes in the floor of the cell, index and register the optical mounting plate and the optical components assembled therewith so as to provide accurate alignment of the laser beam along its beam path.

The beam path is a folded path which folds in the cell 18 containing the deflector 44 so that part of the path is above the central plate 12 and part is below the central plate 12 (on opposite sides of the plate). The path extends through a window 68 in the end wall 30 of the body 10. This window contains a transparent (glass) rectangular plate 69 which is held in place by a frame 70 attached to the end wall 40. The frame 70 and the transparent plate seals the window 68.

The beam which exits from the window 68 is the scanning beam which scans an image plane along scan lines. The scan lines may be made up of dots from which half tone images may be formed by virtue of the use of suitable modulating optical elements in the assembly of elements on the mounting plate 60.

This assembly of elements are all mounted on the mounting plate 60 by suitable brackets which may be held to the plate by bolts or rivets. The elements include a lens 70 which is attached to the mounting plate 60 by a bracket 72. The attaching means are bolts 74 which extend through the bracket 72 into the mounting plate. The lens 70 focuses the laser beam into a fast acousto-optic modulator (AO1) 76 which is operated by electronic components such as a generator of pulses repetitive at a rate, e.g. of 50 MHz. This signal may be generated by electronic components which are housed in the cells 26 or 28 or they may be external to the body 10 and connected via a connector in the end wall 32 to the modulator 76 by means of wires (not shown). The acousto-optic modulator 76 may suitably be of the type sold commercially by Newport Electro-optic Systems of Melbourne, Fla., USA (e.g., their model N15210).

The modulated beam is folded by a mirror 78, collimated by a collimating lens assembly 80 and extends to an acousto-optic diffraction grating modulator (AO2) 82. This modulator establishes a pattern of lines of selected periodicity and optical index in the material of the modulator by means of which the position and intensity of the optical beam may be controlled. By changing the frequency of the control signal to the modulator the position of the beam may be controlled to compensate for cross scan errors due to slight differences in the periodicity of the various grating facets of the deflector 44. This enables each successive scan line on the image plane to be at uniform spacing. In other words cross scan error (deviation in a direction perpendicular to the scanning line) may be compensated using the acousto-optic grating modulator 82. Cross scan errors due to wedge and wobble in the deflector 44 may similarly be compensated by the modulator 82. The grating period in the modulator 82 can be varied during each scan so as to correct for any slant of a scanning line. By changing the amplitude of the drive signal to the modulator 82 the amount of light which is deflected in the zero order, and which is blocked by a stop 84 along the beam path, may be controlled thereby controlling intensity of the scanning beam. This intensity control can be used to correct for scan-to-scan and intrascan intensity variation associated with the facets of the hologon deflector.

A lens 86 between the stop and the modulator 82 allows the beam to diverge so as to insure that the zero order of the beam diffracted in the modulated 82 is blocked by the stop 84.

Mirrors 88 and 90 fold the beam. The beam is again folded along the center line of the body 10 (the center of scan) by another folding mirror 92.

As shown in FIG. 8, modulator 82 (AO2) receives the laser beam via a turning mirror 89 so that the beam is deflected by the modulator as it travels along the center line of the unit. Since the modulator 82 deflects the beam, it may be referred to as a "mini-deflector." The lens 86 and stop 84 are located along the center line and function as described above. In the system of FIG. 8, the turning mirrors 88, 90 and 92 (FIG. 1) are not needed.

It has been found that a major source of scan line spacing error in images recorded with a laser scanner, results from variation in the speed of the motion of the receptor surface which is in the image plane. This may be due to velocity error in the transport system for film when film is used as the receptor or in variation in rotational speed of the drum 93 of a xerographic marking engine as shown in FIG. 8. A film transport using a capstan which can cause variations in film speed is shown in W. H. White, *Electronic publishing and printing*, August/September 1986, pages 40–42. The principal components of the marking engine are shown and labeled in FIG. 8. They are conventional. The image is shown, by way of example, transferred to print paper which is driven from reel to reel. Conventional paper sheet feeders can be used.

The mini-deflector 82 is used to compensate for minor positional errors (less than 50 μm for each scan) associated with the xerographic drum rotation mechanism or the capstan rotation mechanism for the film transport system. The mini-deflector moves the scan line down if the drum speeds up or up if the drum slows down.

The control signal may be obtained from a track of bars evenly spaced along the edge of the drum, or from specular reflection from the surface of the drum. An opto-electronic motion detector 97 uses a light source and photodetector 99 (e.g., a light emitting diode focused on the track or on the specularly reflecting surface, and a solid state photodetector). The detector includes an amplifier 101 and digitizer 103. The detector 97 will provide, for the track of bars, a pulse train having a repetition rate which follows the speed variations in the drum. Specular reflection results in a noise signal with a frequency modulation component which follows the speed variations of the drum. The digitizer 103 may be implemented by a comparator which outputs a pulse when the reflected signal level exceeds a threshold level. The modulation is a level which crosses the threshold, and the crossings occur in accordance with the speed variations. The pulse rate from the comparator/digitizer 103, thus, corresponds to the speed variations whether a track or specular reflection is used. The pulse signal is applied to the cross-scan control signal generator 105 where it is converted into an analog signal level corresponding to the pulse rate, as by an R/C circuit or other frequency demodulator. The analog signal then is applied to the driver circuits of the AO-2 mini-deflector 82 to deflect the scan beam in the cross scan direction to minimize the scan line positional errors. The detector 97, generator 105 and the mini-deflector 82 comprise a closed loop feedback system. Alternatively optical encoders on the drum or capstan drive shaft may be used to obtain the control signal. Such encoders are commercially available from BEI Motion Systems Company of Little Rock, Ark. 72203 and Teledyne Gurley of Troy, N.Y. 12181-0088.

The beam path extends through openings 94 and 96 in the wall 35 between the cells 14 and 16 and in the wall 37 between the cell 16 and the cell 18, in which the deflector 44 is located. As shown in FIG. 8 and discussed above, the portion of the wall between cells 14 and 16 can be omitted. A collimating lens assembly 98, which is mounted on a bracket 100, collimates the diverging beam and directs it to another folding mirror 102. This mirror is also mounted on a bracket 104. The brackets 100 and 104 are attached to the walls 36 and 38 in indentations 106 and 108 in the top surfaces of these walls.

The beam is then directed to the hologon deflector disc 48. In the illustrated embodiment the angle of incidence and the diffraction angle from the hologon disc are equal to each other and may be 30°. The prism 50 diverts the beam while the preobjective lens 52 focuses the beam on the image plane. Since the beam is chopped (turned on and off by a digital signal that controls the modulator 76), a sequence of dots is scanned along each scan line on the image plane. These dots may be in varying duration (i.e., of lengths) so as to form a halftone image. Alphanumerics and other line images may similarly be formed by techniques known in the art. The fast modulator 76 can also be operated in the analog video mode, and thereby, be used to generate continuous tone images.

In order to seal the housing, cover plates 110 and 112 are placed over the top and bottom surfaces of the walls. Suitable seals, such as packing or stripping may be used and suitable notches (not shown) for receiving this packing may be provided in the end surfaces of the walls. The cell 24 containing the laser preferably is not covered so as to enable heat to be dissipated from the laser. All of the other cells which contain the beam path are covered and contamination, e.g., the entry of dust or other foreign material, which can interfere with the beam is precluded from entering these cells. The sealed cells may also be purged with a non-reactive gas which may be introduced into the sealed body by means of a port (not shown). A suitable gas is nitrogen.

Mirrors 114 and 116 are located on the end wall 30 at the end of the scan (at predetermined distances laterally from the center of scan). These mirrors are best shown in the bottom view FIG. 4. These mirrors deflect the beam onto start-of-scan and end-of-scan photoelectric detectors (EOS and SOS) 118A and 118B. These detectors are used to measure the time of flight of the scan beam across the image plane. Time of flight information is used to correct in-scan positional errors associated with hologon deflector motor hunting. This correction is accomplished by varying the pixel data clock rate. This is the rate that the fast modulator 76 is turned on and off to produce the dots.

In order to compensate for lateral position errors associated with the motion of the receptor surface, the bars or bands of the track on the edge of the drum are shaped in the form of wedges. Then the width of the pulses and the duty cycle of the pulse train from the detector 97 will vary in accordance with the lateral displacement of the drum which is in a direction along its axis 95 of rotation. The signal generator 105 detects the leading and trailing edges of such pulse and develops, using a high frequency clock pulse counter started and stopped on the leading and trailing edges and/or a R/C charging circuit, a voltage corresponding to the pulse width. The rate of change in the voltage is detected and provides a control signal which varies the start of scan and time of flight signals which control the pixel data clock rate signals to the last modulator AO-1 driver circuit. The scan line then starts earlier or later in time and the location of the dots is varied to compensate for lateral positional errors in the same way and in addition to the variation to accommodate for hologon deflector motor hunting.

Referring to FIG. 5, it will be seen that the scanning system is similar to the system illustrated in FIGS. 1 to 4, and like parts are indicated by like reference numerals. The difference between the system of FIG. 5 and that of FIGS. 1 to 4 is that the window 68 is sealed by a non-transmissive plate 119. Another mirror 120 is mounted on the undersurface of the central plate 12 in the cell 20, and directs the scanning beam to an image surface below the housing. The scanning beam passes through a window 120 in the cover 112. This window has a transmissive plate 122 and is hermetically sealed like the window 68 with a frame 124. The end of scan mirrors, one of which 126 is shown in FIG. 5, deflect the scanning beam at the ends of scanback to the mirror 128 and thence to one of the SOS and EOS detectors, one of which 118A is shown in FIG.5.

Referring to FIGS. 6 and 7, there is shown an integrated laser scanning system which utilizes a pair of lasers 200 and 202. These lasers may be helium neon lasers each of the same power rating (e.g. from 2 to 10 mW) and are contained in cylindrical housings.

The system also includes a hologon deflector 204 of a design generally similar to that shown in U.S. Pat.No. 4,610,500 issued Sept. 9, 1986 to Charles J. Kramer. The deflector has a hologon disc 206 which is rotated by a motor 208. A preobjective lens 210 and bending prism 212 are assembled to the housing 214 of the deflector 204. The hologon disc has a plurality of successive pie-shaped grating facets which deflect the beam. The angle of incidence and the angle of diffraction may be equal and, for example suitably 30°.

The scanning system illustrated in FIGS. 6 and 7 includes an assembly 218 of optical elements mounted on an optical mounting plate (OMP) 220 for combining the beams from the two lasers and directing the combined beams to the hologon deflector 206. There are also a collimating lens assembly 222 and a bending mirror 224 which collimate the combined beam and direct it at the selected angle of incidence (in the illustrated case vertically downward) to the hologon disc 206. The scanning beam is reflected by a mirror 226 out of a window 228 in a lower cover plate 230 of a housing 234 onto an image plane where the scanning beam scans the scanning lines. The receptor surface may be moved so as to scan successive lines each of which having a pattern of dots from which a half-tone image can be formed.

The ends of scan are detected by means of mirrors 236, one of which is shown in FIG. 7, which retroreflect light from the beam at the end of scan to a mirror 226, and thence to photoelectric SOS and EOS detectors 238, one of which is also shown in FIG. 7. The detected signals may be used to control the data scanning rate.

The housing 234 is made up of a body having a central plate 240 from which end walls 242 and 246 extend, each from an opposite side of the plate 240. Walls, having apertures for the passage of the beam extend from the surface and define a plurality of cells 248, 250, 252, 254, 256 and 258. The cells 256 and 258 contain the lasers 200 and 202. These laser cells share common walls 257 and 259 with the cell 248 containing the assembly 218 of optical components which combine and modulate the laser beams. The central plate 240 and the walls may be a casting of steel, aluminum or plastic and constitutes an integral body of high stiffness and rigidity, since the plate and walls form a plurality of "I"-beams which extend both longitudinally and laterally (across the length and width) of the body 234.

It will be observed that the beam path to the deflector 204 and from the deflector is folded and extends along opposite sides of the central plate 240 thereby enabling the integrated assembly to be volume efficient.

If desired, the beam may extend through the end wall (the left end of the housing body 234) instead of through the bottom (the cover plate 230) through the window 228 therein. Then the folding mirror 226 may be dispensed with and the end of scan reflecting mirrors 236 disposed further upwardly in the path of the beam which exits the end wall 242.

The cover 230 may be sealed with suitable packing which can provide a hermetic seal to the end surfaces of the wall over those cells which contain components handling the beam path or through which the beam path passes. Another cover 261 which covers and may be hermetically sealed to the upper end surfaces of the walls of the cells, through which the beam path passes, also can hermetically seal those cells and prevent contamination of the beam handling components as well as the introduction of dust or dirt which can interfere with the transmission of the beam. The entire sealed housing may be purged with and contain an inert gas, such as nitrogen, which may be introduced through ports (not shown).

The assembly 218 is mounted in the cell 248 by means of mounting pads under the OMP 220, two of which 264 are shown in FIG. 7. The mounting plate 220 of the assembly 218 is held down by bolts 266 which extend through these pads. The plate and the components thereon are further aligned by pins 268 which may extend from the plate into holes in the central plate 240 or from the central plate into holes in the mounting plate 220.

The walls 270 and 272 of the cell 254 are cut away to define gussets having surfaces 276 on which the housing of the hologon deflector is mounted. These walls 270 and 272 are also recessed so as to provide surfaces on which brackets 278 and 280 for the mirror 224 and collimating lens assembly 222 can be attached. These walls are formed with buttresses in the lower portions thereof as shown at 43 and 45 in FIGS. 1 and 3. With the assembly 218 mounted in place and with the collimating lens 222 and mirror 224 and the hologon deflector 204 mounted in the body 234, there is provided an integrated scanning system with all optical components in alignment, which alignment is maintained because of the rigid, stiff body 234 on which the components are mounted.

It will be noted that the lasers 200 and 202 are mounted by brackets 282 and 284 on the central plate 240. These brackets and other brackets 286 and 288 which extend into the walls 257 and 259 enable the lasers to be rotated. Such rotation enables the beams exiting from the lasers to have predetermined polarizations which are orthogonal to each other and which enable the laser beams to be combined for modulation and deflection by the hologon deflector 204. It will be also noted that the optical components of the assembly 218 which are mounted on the mounting plate 220 are held down by their individual brackets which are bolted in place to the plate 220 so as to enable their adjustment and alignment as an assembly on the mounting plate 220.

The use of two lasers enables two beams to be scanned simultaneously across the image plane. This effectively doubles the scanning rate and provides twice the number of dots on the image plane than with a single beam. The use of two beams avoids the necessity of rotating the hologon disc at twice the speed. Rotation at twice its normal speed (for example 24,000 rpm instead of 12,000 rpm) may create stresses beyond the ability of the disc and motor physically to withstand. In addition, in order to double the number of dots per unit length in a single beam, the beam would have to be chopped (turned on and off) at twice the rate. The electronics and modulators operate reliably at approximately a 50

MHz rate. To increase the rate to 100 MHz would adversely affect the reliability of the modulators. Modulators which are commercially available, for example from Newport Electro-optic Systems of Melbourne, Fla., USA are only rated at approximately 50 MHz. An additional advantage is that the two lasers provide more power at lower cost than a single higher power laser.

Interactions between a pair of laser beams, in a common modulator, and the requirement that the beams incident on the hologon deflector be diffracted and scanned with like efficiency so that the same beam intensity is obtained in the dots from both beams which are simultaneously scanned, are overcome by combining orthogonally polarized beams from each of the lasers, converting the polarization of those beams after combination into circularly polarized beams, but of opposite sense (one being circularly polarized in a left hand sense and the other in a right hand sense). The circularly polarized beams are equally affected during modulation, and since circular polarization is the average of their S and P polarizations, the efficiency of diffraction in the hologon deflector is the same for each of the circularly polarized beams, regardless of their hand. Accordingly, the advantages of the use of plural beams, without the disadvantages occurring upon the mixing thereof, is obtained.

As noted above the lasers are oriented so that the polarization from one of the lasers indicated at E-1 in the drawing is orthogonal to the polarization from the other laser which is indicated at E-2 (into the plane of the paper) in FIG. 6.

First lenses, L-1 focus the beams from the lasers 200 and 202 into fast acousto-optic modulators AO-1. These modulators may be of the type which chop (turn on and off) the beam so as to provide the dots along the scan line at the desired rate (dots per inch or centimeter). These modulators AO-1 may be commercial units of the type identified above (e.g., available from Newport Electro-optic Systems of Melbourne, Fla., USA —their model N15210). The electronics for operating the modulators AO-1 and an acousto-optic diffraction grating modulator AO-2 is provided by signal processing and generating electronics of conventional design which may be mounted externally or in cells, below the cells containing, the lasers internally of the housing 234, or located outside the housing 234 in a separate enclosure The chopped beams are turned by mirrors M-1 and collimated by lenses L-2. The orthogonally polarized beams are deflected, by another mirror M-2 and by a prism p-1, into a polarization sensitive beam combiner BC. The BC element can be a multi-layer dielectric coated mirror or a grating element having a wavelength to grating period equal to 1.4142. This combiner allows the beam of polarization E-1 to pass through without reflection while it totally reflects the beam of polarization E-2. The use of orthogonal polarizations and the polarization sensitive combiner, BC, ensure high beam combining efficiency. The beams may be slightly displaced by tilting the mirror M-2. In this connection, the mirror M-2 may have piezo-electric adjusting elements so as to adjust the beam in both cross scan and in scan directions (perpendicular to, and in the direction of the scan lines). A dual zone photodetector PD may be used to sense the location of the dual beams and provide control signals to the piezo-electric adjusting elements of mirror M-2. The design of circuitry for driving control signals for the adjusting elements is disclosed in A. Arimoto, et al., *Appl. Optics*, 26, 13, pps. 2554–2557 (July 1, 1987). Two beams, which are collinear with each other in the scan direction and can have a slight offset in the cross-scan direction, are then passed through a quarter waveplate WP which imposes a phase shift of 90° at the wavelength of the laser beams (the wavelength being the same for both beams). Accordingly, the output beams from the waveplate WP are circularly polarized. Because the beams have orthogonal polarizations, their circular polarization will be of opposite hands (in opposite senses).

The modulation of the intensity of the beams and also their tilt (to adjust for cross scan errors due to errors in facet to facet grating periodic of the deflector disc 206 and deflector wobble and wedge errors) is accomplished in an acousto-optic diffraction grating modulator AO-2. AO-2 may be a commercial unit, suitably Model DLM-40-V-7 sold by Anderson Laboratories of Bloomfield, Conn., USA. Since the beams are circularly polarized, the modulator affects each beam in the same way and provides the same tilt and intensity modulation to the beams.

Upon leaving the modulator the beams pass through a lens which has a focus ahead of a stop. The stop traps and blocks the zero order diffraction component from the diffraction grating modulator AO-2. The first order diffraction component continues diverging until it reaches the collimating lens 222. In the event that the lens L-3 does not sufficiently diverge the beam another negative (diverging) lens may be mounted on the mounting plate 220 between the stop and the collimating lens 222.

The collimated beams are then deflected by the mirror 224 to the hologon deflector where they are diffracted and scanned across the image plane. Since the hologon deflector has equal efficiency for circularly polarized light, the efficiency being the average efficiency for both the S and P components of polarization of the circularly polarized light, the hologon deflector diffracts both beams with like efficiency and a pair of beams are scanned across the image plane in each line.

From the foregoing description it will be apparent that there has been provided improved scanning apparatus and particularly integrated laser scanner systems. Presently preferred embodiments of these systems have been described. Variations and modifications thereof within the scope of the invention will no doubt become apparent to those skilled in the art. For example, the two laser beams (FIGS. 6 and 8) can be generated from a single laser by means of a beam splitter, with orthogonal polarization, modulated and recombined. This may be desirable when the lasers are expensive components (e.g. argon type lasers). Accordingly, the foregoing description should be taken as illustrative and not in a limiting sense.

I claim:

1. A scanning system which comprises means for providing first and second light beams of the same wavelength and which are polarized in orthogonal directions, means for combining said beams along paths extending in the same direction, means along said paths for circularly polarizing said beams, and a deflector for scanning said combined circularly polarized beams across an image surface.

2. The system according to claim 1 wherein said deflector includes a rotatable diffraction grating.

3. The system according to claim 2 wherein said grating is a holographic grating.

4. The system according to claim 3 wherein said grating is formed on a rotatable disc through which said beam is transmitted.

5. The system according to claim 1 wherein said deflector is a light transmissive member having a diffraction grating formed therein and further including means disposed along said paths between said polarizing means and said deflector for modulating and deflecting said combined beams.

6. The system according to claim 5 further comprising means for turning each of said first and second beams on and off at a predetermined rate.

7. The system according to claim 5 wherein said modulating means comprises an acousto-optic grating.

8. The system according to claim 1 wherein a first and second laser are used to provide said first and second light beams, respectively.

9. The system according to claim 1 further comprising means operative upon at least one of said first and second beams for displacing said beam or beams from each other in a direction transverse to the direction of scanning of said beams across said image surface.

10. The system according to claim 1 wherein said combining means is a polarization sensitive element for transmitting one of said first and second beams and for reflecting the other said first and second beams so that they propagate along said paths toward said deflector.

11. The system according to claim 10 wherein said polarization sensitive element is a mirror.

12. The system according to claim 10 wherein said polarization sensitive element is a diffraction grating element where the ratio of said wavelength to the period of said grating element is approximately 1.4142.

13. The system according to claim 1 further comprising means for directing said first and second beams into said combining means such that the paths of said beams when combined are collinear with each other in the scan direction.

14. The system according to claim 1 wherein said circularly polarizing means is a quarter-wave plate.

* * * * *

UNITED STATES PATENT AND TRADEMARK OFFICE
CERTIFICATE OF CORRECTION

PATENT NO. : 4,786,126
DATED : November 22, 1988
INVENTOR(S) : Charles J. Kramer It is certified that error appears in the above-identified patent and that said Letters Patent is hereby corrected as shown below:

Figure 6 should be deleted to be replaced with figure 6 as shown on the attached sheet.

Signed and Sealed this

Twenty-eighth Day of August, 1990

Attest:

HARRY F. MANBECK, JR.

Attesting Officer

Commissioner of Patents and Trademarks